United States Patent
McGrath

(10) Patent No.: US 10,204,502 B2
(45) Date of Patent: Feb. 12, 2019

(54) BAGGAGE DELIVERY NOTIFICATION SYSTEM AND METHOD

(71) Applicant: NCR CORPORATION, Duluth, GA (US)

(72) Inventor: Adrian McGrath, Winter Springs, FL (US)

(73) Assignee: NCR Corporation, Atlanta, GA (US)

( * ) Notice: Subject to any disclaimer, the term of this patent is extended or adjusted under 35 U.S.C. 154(b) by 467 days.

(21) Appl. No.: 13/753,618

(22) Filed: Jan. 30, 2013

(65) Prior Publication Data

US 2014/0210623 A1    Jul. 31, 2014

(51) Int. Cl.
G08B 21/18 (2006.01)
G06Q 10/08 (2012.01)

(52) U.S. Cl.
CPC ............. *G08B 21/18* (2013.01); *G06Q 10/08* (2013.01)

(58) Field of Classification Search
CPC ................................ G08B 21/24; G06Q 50/28
USPC ........................................................ 340/572.1
See application file for complete search history.

(56) References Cited

U.S. PATENT DOCUMENTS

| | | | | |
|---|---|---|---|---|
| 5,051,565 A * | 9/1991 | Wolfram | ...................... | 235/384 |
| 6,044,353 A * | 3/2000 | Pugliese, III | .......... | G06Q 10/02 235/375 |
| 6,750,757 B1 * | 6/2004 | Gabig et al. | .................. | 340/10.1 |
| 7,845,569 B1 * | 12/2010 | Warther et al. | ............... | 235/492 |
| 2004/0075618 A1 * | 4/2004 | Kohan et al. | .................. | 345/1.1 |
| 2004/0124982 A1 * | 7/2004 | Kovach | ...................... | 340/572.1 |
| 2006/0161979 A1 * | 7/2006 | Pandey | ................. | G06F 21/577 726/22 |
| 2008/0074267 A1 * | 3/2008 | Sugiyama | .............. | B41J 3/4075 340/572.1 |
| 2008/0180247 A1 * | 7/2008 | Deoalikar et al. | ......... | 340/572.1 |
| 2008/0250077 A1 * | 10/2008 | Fahey | ................ | G11B 20/1803 |
| 2009/0040048 A1 * | 2/2009 | Locker et al. | ............. | 340/572.1 |
| 2010/0169420 A1 * | 7/2010 | McCoy | ............... | H04L 12/2807 709/204 |
| 2010/0300839 A1 * | 12/2010 | Glass | ...................... | B64F 1/368 198/502.1 |
| 2011/0133892 A1 * | 6/2011 | Nohr | ........................... | 340/10.1 |

(Continued)

FOREIGN PATENT DOCUMENTS

JP    2009 301425    12/2009

OTHER PUBLICATIONS

Aicha Slassi Sennou, et al., "An interactive RFID-based Bracelet for Airport Luggage Tracking System", Intelligent Systems Modelling & Simulation (ISMS), 2014 4th International conference on, IEEE, Jan. 29, 2013.

(Continued)

*Primary Examiner* — Joseph H Feild
*Assistant Examiner* — Pameshanand Mahase
(74) *Attorney, Agent, or Firm* — Schwegman Lundberg & Woessner, P.A.

(57) ABSTRACT

A baggage delivery notification system and method which alerts passengers when their baggage arrives. An example method includes obtaining a baggage identifier on a bag at a baggage claim carousel from a reader, determining a passenger associated with the baggage identifier, and alerting the passenger that the bag is at the baggage claim carousel. The method may further include determining a time of arrival of the bag at the baggage claim carousel and alerting the passenger to the time of arrival.

14 Claims, 2 Drawing Sheets

(56) References Cited

U.S. PATENT DOCUMENTS

2011/0267192 A1\* 11/2011 Goldman et al. .......... 340/568.1
2013/0168443 A1\* 7/2013 Lin .................... G06Q 10/0833
                                                               235/375

OTHER PUBLICATIONS

EPO Abstract: JP 2009 301425.

\* cited by examiner

BAGGAGE DELIVERY NOTIFICATION SYSTEM AND METHOD

BACKGROUND

The present invention relates to baggage delivery systems, and more specifically to a baggage delivery notification system and method.

Baggage or luggage delivery systems typically include a carousel where bags are deposited after arrival. Travelers crowd around the carousel, potentially making it difficult for others to get to their bags, because they are unsure of when their bags will appear. Travelers may accidentally grab similar looking bags which are not theirs. Such as system may lead to anxiety in travelers as they try to find their bags while hoping that their bags are not lost.

Therefore, it would be desirable to provide a baggage delivery notification system that improves the baggage delivery process for travelers.

SUMMARY

In accordance with the teachings of the present invention, a baggage delivery notification system and method are provided.

An example method includes obtaining a baggage identifier on a bag at a baggage claim carousel from a reader, determining a passenger associated with the baggage identifier, and alerting the passenger that the bag is at the baggage claim carousel. The method may further include determining a time of arrival of the bag at the baggage claim carousel and alerting the passenger to the time of arrival.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
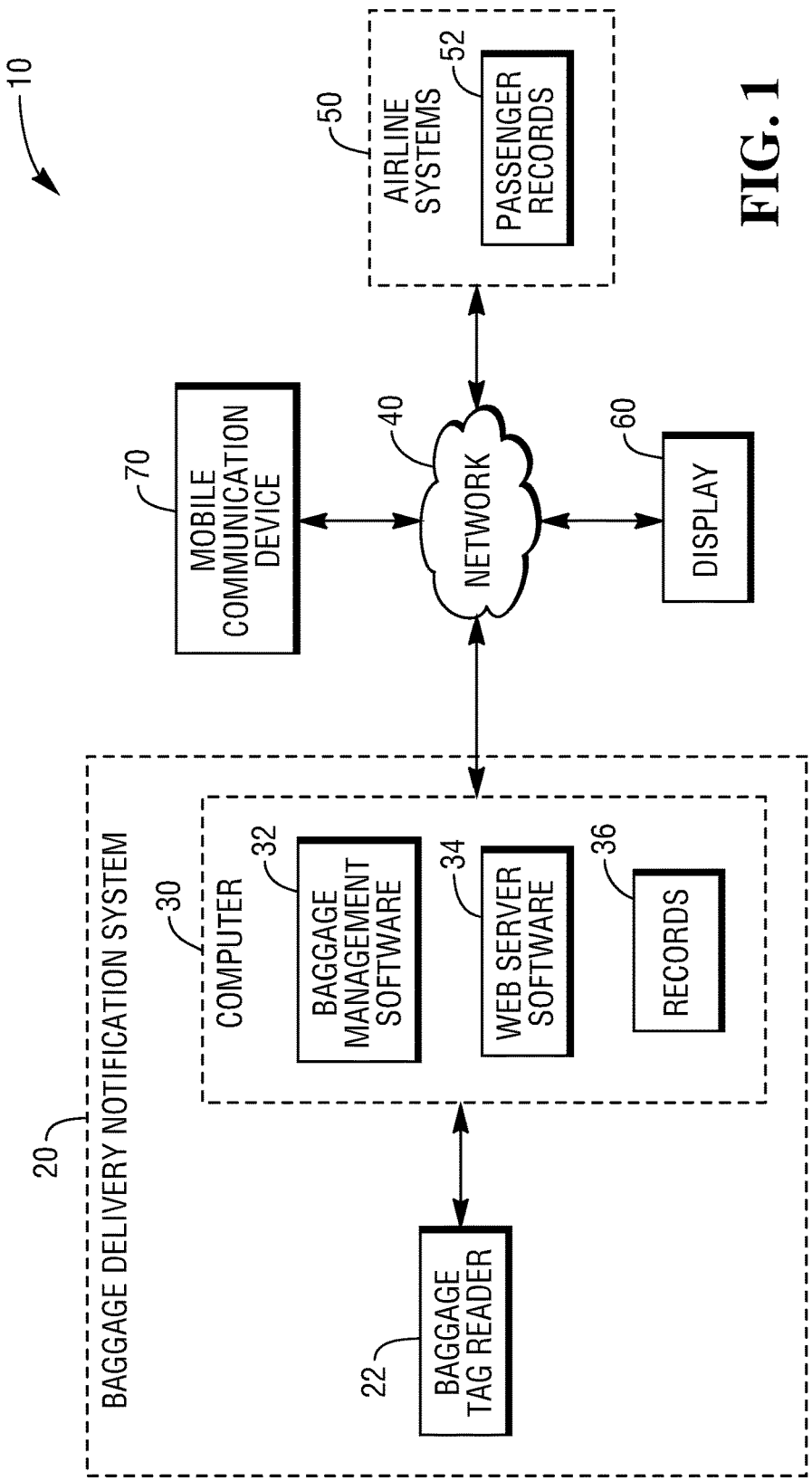
FIG. 1 is a block diagram illustrating an example travel system.

Turning now to FIG. 1, an example travel system 10 is illustrated. While the following example embodiment illustrates an example travel system 10 based upon airline travel, the present invention is applicable to other forms of travel, such as bus, train, or ship.

Example travel system 10 includes baggage delivery notification system 20. Baggage delivery notification system 20 includes baggage tag reader 22 which reads baggage identifiers on baggage tags at a baggage claim area for deposit on a baggage claim carousel. Baggage tag reader 22 may read the baggage identifiers before or after they are placed on the baggage claim carousel.

Baggage identifiers may include barcodes or radio frequency identification (RFID) labels or other indicia on baggage tags. Baggage tag reader 22 may include a barcode reader or an RFID label reader.

In one embodiment, baggage tag reader 22 may be a portable baggage tag reader, such as a hand-held barcode reader or RFID label reader.

In another example embodiment, baggage tag reader 22 may be a fixed or stationary baggage tag reader that reads baggage identifiers as baggage passes by on the baggage claim carousel. For this purpose, baggage tag reader 22 may be part of the baggage carousel.

Baggage tag reader 22 may be coupled to computer 30, which is coupled to network 40, or be directly coupled to network 40 through a wired or wireless connection.

Computer 30 executes baggage management software 32, which identifies a passenger associated with a particular bag using the information in the bag identifier. In one example embodiment, baggage management software 32 connects to airline systems 50 to obtain passenger information from passenger records 52. The format of baggage identifiers may be different to limit the search to a single airline system 50.

Passenger information may include passenger identification information, such as a passenger name, seat number, baggage claim number, and/or other identifier. Passenger information may include other information, such as a flight number. The format of baggage identifiers may be different to limit the search to a single airline system 50.

Baggage management software 32 displays a message and/or information on display 60 located adjacent the baggage carousel assigned to the passenger's flight. The message and/or information may include passenger identification information. Baggage management software 32 may additionally send other passenger information to be displayed by display 60, such as the flight number.

As a further enhancement, baggage management software 32 may determine a baggage arrival time at the baggage carousel equal to, or based upon, a time when a corresponding baggage identifier is read by baggage tag reader 22 and cause display 60 to display the baggage arrival time.

In a further enhancement, baggage management software 32 is also capable of sending messages, such short message service (SMS or "text"), e-mail, automated voice, and/or other messages. Baggage management software 32 may send a message to a passenger's mobile communication device 70 when baggage identifier on the traveler's baggage has been read by baggage tag reader 22.

For this purpose, computer 30 may include a web server connected to the World Wide Web (WWW or "web") with web server software 34 for hosting a web site with web content, including web pages facilitating registration. The website may be part of an airport website.

Passengers may connect to the website using mobile communication device 70 or other computer to register for baggage arrival alerts. Computer 30 stores contact information for passengers who register for baggage arrival alert messages in records 36. Contact information may include a phone number associated with mobile communication device 70 and/or an email address.

Mobile communication device 70 may include a Smartphone, personal digital assistant, or other portable communication device. Mobile communication device 70 includes a processor, memory, and program and data storage. Mobile communication device 70 may execute an operating system such as a Microsoft, Apple, Google, or other operating system. Mobile communication device 70 may include web browser software for connecting to the web site of baggage management system 30.

Mobile communication device 70 further include graphics circuitry for connecting to a display, network circuitry for connecting to network 40, and other circuitry for connecting to other peripherals, such as a touch screen.

As an alternative to accessing a web page, mobile communication device 70 may execute a software applet written to be executed within the operating system of mobile communication device 70 that connects to baggage management system 30 and registers a passenger for baggage arrival alert messages.

When baggage management software 32 receives a baggage identifier from baggage tag reader 22, baggage management software 32 determines contact information from records 36 using passenger information obtained from passenger records 52. Baggage management software 32 determines whether the passenger information is in records 36. If so, baggage management software 32 sends an alert message via network 40.

In another embodiment, passengers may register to receive messages through airline websites when they purchase tickets or check-in for flights. Airline systems 50 may include a link to the web site of baggage delivery notification system 20 or may capture passenger contact information and send it to baggage delivery notification system 20.

Display 60 may include a television or computer display/monitor coupled to network 40 directly or through another computer system.

Computer 30 includes a processor, memory, and program and data storage. Computer 30 may execute an operating system such as a Microsoft or Linux operating system. Computer 30 further includes network circuitry for connecting to network 40, and may include other circuitry for connecting to peripherals.

In an example alternative embodiment, computer 30 and baggage tag reader 22 may be combined as a portable terminal.

Network 40 may include any combination of wireless or wired networks, including local area, wide area, virtual private, and global communication networks, such as the Internet.

Figure 2:
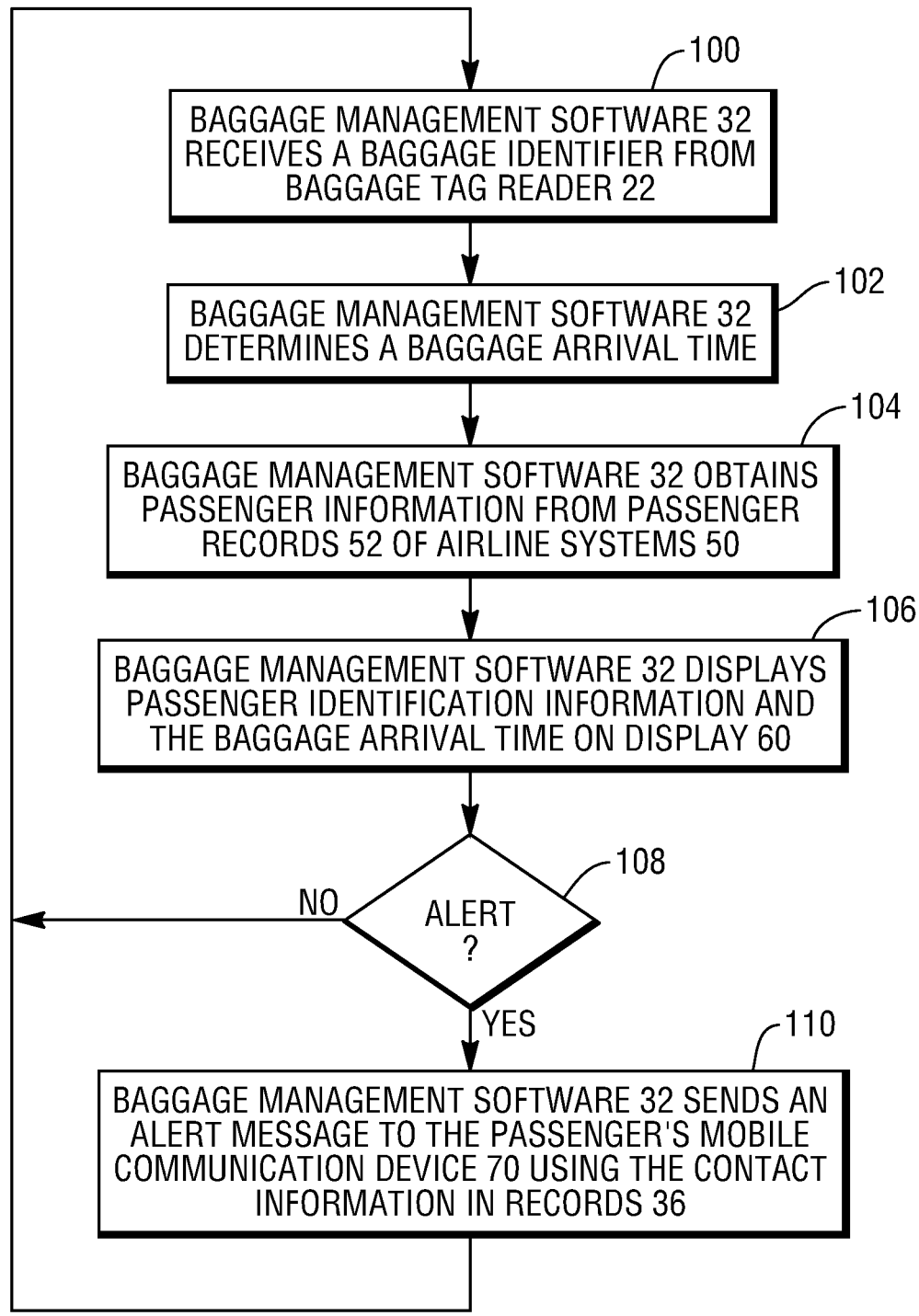
FIG. 2 is a flow diagram of an example baggage delivery notification process.

With reference to FIG. 2, an example baggage delivery notification process is illustrated.

In step 100, baggage management software 32 receives a baggage identifier from baggage tag reader 22.

In step 102, baggage management software 32 determines a baggage arrival time.

In step 104, baggage management software 32 obtains passenger information from passenger records 52 of airline systems 50. The format of baggage identifiers may be different to limit the search to a single airline system 50.

In step 106, baggage management software 32 displays passenger identification information and the baggage arrival time on display 60 located adjacent the baggage carousel assigned to the passenger's flight. Passenger identification information may include a passenger name, seat number, baggage claim number, and/or other identifier from passenger information in passenger records 52. Baggage management software 32 may additionally send other passenger information to be displayed by display 60, such as the flight number.

In step 108, baggage management software 32 determines whether the passenger identification information is in records 36.

If so, baggage management software 32 sends an alert message to the passenger's mobile communication device 70 using the contact information in records 36 in step 110.

Operation returns to step 100 to repeat the process for each item of baggage for each passenger that arrives.

Advantageously, a passenger may choose to avoid carousel until the passenger receives alert messages for all baggage items.

Although the present invention has been described with particular reference to certain preferred embodiments thereof, variations and modifications of the present invention can be effected within the spirit and scope of the following claims.

What is claimed is:

1. A processor-implemented baggage delivery notification method programmed in memory and/or a non-transitory computer-readable medium as software that executes on one or more processors configured to execute the method, comprising:
   obtaining, by the software that executes on one or more processors of a computer, a baggage identifier on a bag at a baggage claim carousel from a reader that is part of the baggage claim carousel, wherein the baggage identifier comprises a barcode;
   determining, by the software, a passenger associated with the baggage identifier by identifying a format for the baggage identifier, identifying an airline system based on the format, connecting to an airline system, and obtaining passenger information using the baggage identifier from the airline system; and
   alerting, by the software, the passenger that the bag is at the baggage claim carousel in response to determining that passenger information for the passenger is identified in passenger records, wherein alerting further includes notifying a mobile applet executing within an Operating System (OS) of a mobile communication device operated by the passenger and in response to the mobile applet registering for notification, wherein alerting further includes also alerting the passenger when the passenger accesses a link providing on a web site of an airline website that activates the alerting with the passenger information.

2. The method of claim 1, wherein alerting comprises displaying passenger information in the form of a message on a display at the baggage claim carousel.

3. The method of claim 1, further comprising determining, by the software, a time of arrival of the bag at the baggage claim carousel and alerting the passenger to the time of arrival.

4. The method of claim 1, wherein alerting comprises sending a message to the mobile communication device of the passenger.

5. A processor-implemented baggage delivery notification method programmed in memory and/or a non-transitory computer-readable medium as software that executes on one or more processors configured to execute the method, comprising:
   registering, by the software that executes on the one or more processors of a computer, contact information of a passenger;
   obtaining, by the software, a baggage identifier on a bag at a baggage claim carousel from a reader that is part of the baggage claim carousel, wherein the baggage identifier comprises a barcode;
   determining, by the software, a passenger associated with the baggage identifier by identifying a format for the baggage identifier, connecting to an airline system based on the format, and obtaining passenger information from the airline system using the baggage identifier; and
   contacting, by the software, the passenger using the contact information when the bag is at the baggage claim carousel in response to determining that passenger information for the passenger is identified in passenger records, wherein contacting further includes notifying a mobile applet executing within an Operating System (OS) of a mobile communication device operated by the passenger and in response to the mobile applet registering for notification, wherein contacting further includes also contacting the passenger when the passenger accesses a link providing on a web site of an airline website that activates the contacting with the contact information.

6. The method of claim 5, wherein the contact information comprises an email address and wherein contacting comprises sending an email to the passenger using the email address.

7. The method of claim 5, wherein the contact information comprises a phone number of the mobile communication device of the passenger and wherein contacting comprises sending a text message to the passenger using the phone number.

8. The method of claim 5, wherein the contact information comprises a phone number of the mobile communication device of the passenger and wherein contacting comprises sending a voice message to the passenger using the phone number.

9. The method of claim 5, further comprising displaying, by the software, a message on a display at the baggage claim carousel.

10. The method of claim 5, further comprising determining, by the software, a time of arrival of the bag at the baggage claim carousel and using the contact information to send the time of arrival to the mobile communication device of the passenger.

11. A baggage delivery notification system comprising:
a baggage tag reader that is part of the baggage claim carousel;
a computer that includes one or more processors and the computer programed with software from a non-transitory memory and/or a non-transitory computer-readable storage medium, wherein the software executes on the one or processors, and the software configured to: obtain a baggage identifier on a bag at a baggage claim carousel from the reader, determine a passenger associated with the baggage identifier, and alert the passenger that the bag is at the baggage claim carousel in response to determining that passenger information for the passenger is identified in passenger records, wherein the baggage identifier comprises a barcode that notifies a mobile applet executing within an Operating System (OS) of a mobile communication device operated by the passenger and in response to a notification provided by the mobile applet, the software further configured to: register the notification and also alert the passenger when the passenger accesses a link providing on a web site of an airline website that activates an alert with the passenger information, wherein the software is further configured to identify a format for the baggage identifier, connect to an airline system based on the format, and obtain the passenger information from the airline system.

12. The system of claim 11, wherein the computer sends a message to the mobile communication device of the passenger.

13. The system of claim 11, further comprising a display at the baggage claim carousel, wherein the computer sends a message to the display.

14. The system of claim 11, wherein the computer also determines a time of arrival of the bag at the baggage claim carousel and alerts the passenger to the time of arrival.

* * * * *